(12) United States Patent
Tena et al.

(10) Patent No.: US 9,818,217 B2
(45) Date of Patent: Nov. 14, 2017

(54) DATA DRIVEN DESIGN AND ANIMATION OF ANIMATRONICS

(71) Applicant: Disney Enterprises, Inc., Burbank, CA (US)

(72) Inventors: Jose Rafael Tena, Pittsburgh, PA (US); Derek Bradley, Zurich (CH); Thabo Beeler, Zurich (CH); Jon Snoddy, Pasadena, CA (US); Alfredo Ayala, West Covina, CA (US); Iain Matthews, Pittsburgh, PA (US); Anthony Martin, Huntington Beach, CA (US); Scott F. Watson, Marina Del Rey, CA (US)

(73) Assignee: Disney Enterprises, Inc., Burbank, CA (US)

(*) Notice: Subject to any disclaimer, the term of this patent is extended or adjusted under 35 U.S.C. 154(b) by 20 days.

(21) Appl. No.: 14/937,605

(22) Filed: Nov. 10, 2015

(65) Prior Publication Data
US 2017/0132827 A1    May 11, 2017

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01); *G06T 2200/24* (2013.01); *G06T 2200/28* (2013.01); *G06T 2213/08* (2013.01)

(58) Field of Classification Search
None
See application file for complete search history.

(56) References Cited

U.S. PATENT DOCUMENTS

2014/0204084 A1*   7/2014   Corazza ................. G06T 13/40
345/420

OTHER PUBLICATIONS

Bermano, Amit, et al. "Augmenting physical avatars using projector-based illumination." ACM Transactions on Graphics (TOG) 32.6 (2013): 189.*
Bickel, Bernd, et al. "Physical face cloning." ACM Transactions on Graphics (TOG) 31.4 (2012): 118.*
Yeongho Seol "Spacetime Expression Cloning for Blendshapes" Apr. 1, 2012, pp. 1-12.
Thabo Beeler "High-Quality Passive Facial Performance Capture using Anchor Frames" Aug. 2011, pp. 1-10.
Thabo Beeler "Rigid Stabilization of Facial Expressions" Jul. 30, 2015, pp. 1-9.
Thabo Beeler "High-Quality Single-Shot Capture of Facial Geometry" May 2010, pp. 1-9.
(Continued)

*Primary Examiner* — Zhengxi Liu
(74) *Attorney, Agent, or Firm* — Farjami & Farjami LLP

(57) ABSTRACT

There is provided a method for use by a system including a hardware processor and a memory storing a three-dimensional (3D) character data having a topology mesh describing a character. The method includes stabilizing the 3D character data by removing a translational motion and a rotational motion from the 3D character data, determining a range of motion of a plurality of points of the topology mesh describing the character, identifying a plurality of poses for generating an animation, where each of the plurality of poses includes a unique configuration of the plurality of points of the topology mesh, and creating an animatronic including a plurality of actuators configured to instantiate the plurality of poses for generating the animation.

15 Claims, 8 Drawing Sheets

(56) References Cited

OTHER PUBLICATIONS

J.P. Lewis "Practice and Theory of Blendshape Facial Models" Eurographics 2014, pp. 1-20.
Pablo Garrido "Reconstructing Detailed Dynamic Face Geometry from Monocular Video" ACM Trans. Graph., 2013, pp. 1-10.
Hao Li "Example-Based Facial Rigging" ACM Trans. Graph., 2010, pp. 1-6.
J. Rafael Tena "Interactive Region-Based Linear 3D Face Models" ACM Trans. Graph., 2011, pp. 1-9.

\* cited by examiner

DATA DRIVEN DESIGN AND ANIMATION OF ANIMATRONICS

BACKGROUND

Animatronics are robotic characters that are brought to life by designers and animators who create lifelike imitations of human and animated characters. Modern animatronics have found widespread use in movie special effects and theme parks and have, since their inception, been used as a spectacle of amusement. Conventional animatronic design and animation are difficult, time-consuming, and expensive, as the animatronic design parameters and animation parameters are both created and re-created over and over again manually until the result is satisfactory. After a designer manually designs an animatronic character, an animator must typically adjust one or a plurality of actuators in the animatronic to achieve a pose of the animatronic, and must create many sequential poses to create lifelike motions. However, animatronics designed and animated in a conventional manner may leave viewers unsatisfied for creating an approximation of the character that is limited by the interpretation of the designer and the animator.

SUMMARY

The present disclosure is directed to systems and methods for data driven design and animation of animatronics, substantially as shown in and/or described in connection with at least one of the figures, as set forth more completely in the claims.

DETAILED DESCRIPTION

Figure 1:
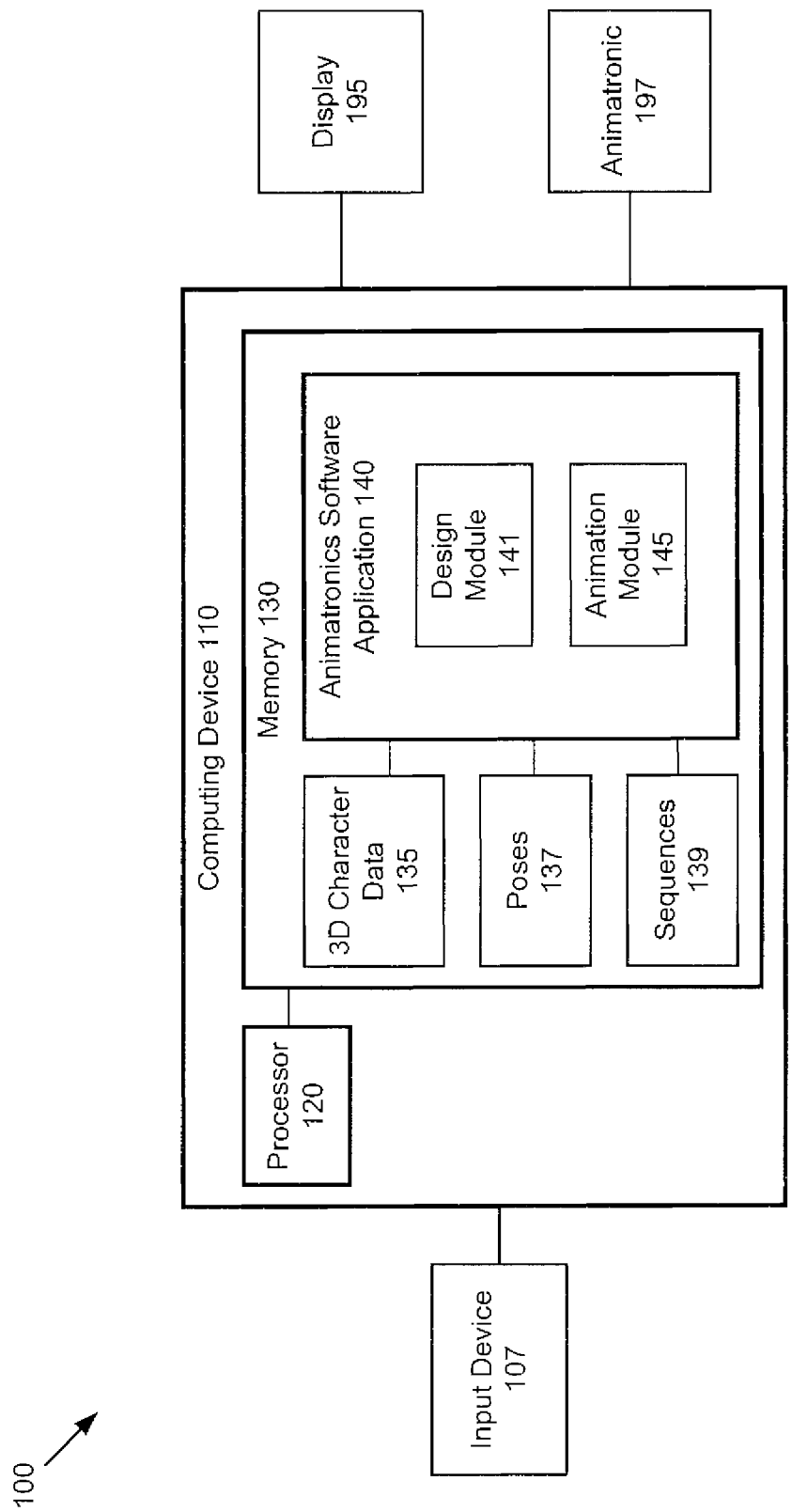
FIG. 1 shows a diagram of an exemplary system for data driven design and animation of animatronics, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for data driven design and animation of animatronics, according to one implementation of the present disclosure. System 100 includes input device 107, computing device 110, display 195, and animatronic 197. Computing device 110 includes processor 120 and memory 130. Processor 120 is a hardware processor, such as a central processing unit (CPU) used in computing devices. Memory 130 is a non-transitory storage device for storing software for execution by processor 120, and also storing various data and parameters. Memory 130 includes three-dimensional (3D) character data 135, poses 137, sequences 139, and animatronics software application 140.

Input device 107 may be a device for receiving information about a character. In some implementations, input device 107 may be a camera for receiving an image of the character, such as a picture of a human character, a plurality of pictures of a human character, or a video of a human character. In other implementations, input device 107 may include a computer providing character information for an animated character, such as character information for a two-dimensional (2D) character or character information for a 3D character. Input device 107 may alternatively include a 3D scanner for collecting 3D character information by scanning a human character. In some implementations, input device 107 may include a 3D scanner for receiving animatronic pose information by scanning an animatronic such as animatronic 197. Input device 107 may include a computer interface including an input device, such as a computer keyboard and mouse.

3D character data 135 may include 3D information about a character, such as a character from a television show or a movie. In some implementations, 3D character information may include information about a human character or an animated character. 3D character data 135 may include information such as a 3D mesh that describes the character, and may include a mesh of the character's face. The 3D mesh may be a constant-topology mesh, such that each intersection point of the mesh references the same point of the character at all points in time. Depending on the character, the 3D data may come from different sources. For computer graphics (CG) animated characters, 3D character data 135 may be directly solicited from the creators of the character. 3D character data 135 may be obtained by exporting the 3D geometry of the CG animated character for a large volume of animation frames. For human characters, the 3D character data may be acquired by 3D scanning, image processing techniques, video processing techniques, or a combination of 3D scanning, image processing techniques, and video processing techniques. Depending on the availability of the human subject embodied by the animatronic, the mix of 3D scanning and video processing may differ. For subjects that are easily available, all the necessary data can be captured using dynamic facial 3D scanning. If availability of the subject is limited, the 3D data can be acquired by a few, or at least one, single-shot 3D scan of the face, along with video data of the human character. The video data may be recorded or extracted from publicly available footage. The single-shot 3D scan and video data can be combined to reconstruct the required 3D data. The key requirement is that all the 3D data of the subject or CG character has the same mesh topology, so that the data encodes the motion of a single 3D mesh through time.

Poses 137 may describe a plurality of poses corresponding to the character. In some implementations, each pose of poses 137 may correspond to a unique configuration of a constant topology mesh. In some implementations, each pose of poses 137 may include a configuration of actuators, such that each pose of the plurality of poses uniquely describes a configuration of actuators in animatronic 197. Poses 197 may be used to animate animatronic 197. For example, animating animatronic 197 may include programming a plurality of poses from poses 197 to be sequentially instantiated, using animatronic 197. In some implementations, sequences of poses may be stored in sequences 139 such that, when instantiated in order, using animatronic 197, may form lifelike motion.

Animatronics software application 140 is a computer algorithm stored in memory 130 for execution by processor 120. Animatronics software application 140 includes design module 141 and animation module 145. Animatronics software application 140 may be used to design an animatronic based on 3D character data 135, and may be used to animate the animatronic based on 3D character data 135. Although Animatronics software application 140 of FIG. 1 includes both design module 141 and animation module 145, in other implementations, each of design module 141 and animation module 145 may be a separate software applications running on computing device 110. In yet other implementations, each of design module 141 and animation module 145 may be a separate software applications running on different computing devices.

Design module 141 is a computer algorithm that helps guide the design of an animatronic. Design module 141 may use 3D character information 135 to design an animatronic corresponding to 3D character information 135. In some implementations, design module 141 may use 3D character data 135 and poses 137 to design an animatronic to emulate a human character or a CG character. In some implementations, design module 141 may be used to design a CG style rig of an animatronic such as animatronic 197.

Animation module 145 is a computer algorithm for animating animatronic 197. In some implementations, animation module 145 may enable a CG model of animatronic 197 to exhibit the same behavior as animatronic 197. Animation module 145 may be used to create an animation that may be reproduced using animatronic 197. In some implementations, the animation reproduced using animatronic 197 will be substantially the same as the animation created using animation module 145. In some implementations, animation module 145 may create a CG model of animatronic 197 that can be animated using traditional animation software packages. One key is that the CG model is to exhibit the same behavior as its mechanical counterpart, so that any animation created using the CG model can be played back on the animatronic head without observing major differences. Display 195 may include a display suitable for displaying video content and/or animation content. In some implementations, display 195 may include a television, a computer monitor, a display of a tablet computer, or a display of a mobile phone. Display 195 may be a light emitting diode (LED) display, an organic light emitting diode (OLED) display, a liquid crystal display (LCD), a plasma display, a cathode ray tube (CRT), an electroluminescent display (ELD), or other display appropriate for viewing video content and/or animation content.

Animatronic 197 may be a robotic device that may emulate a human or animated character, and animatronic 197 may be based on a human character or an animated character. In some implementations, animatronic 197 may be built to move in a lifelike manner and may be designed and built to look and move in substantially the same as the character on which animatronic 197 is based. Animatronic 197 may include a plurality of actuators, where an actuator may be a movable component that moves or controls animatronic 197. Each actuator in animatronic 197 may be electric, pneumatic, hydraulic, or other type of actuator suitable for animating animatronic 197, and animatronic 197 may include a combination of different types of actuators. In some implementations, animatronic 197 may include a portion of the character to be animated, such as a head of the character or a face of the character, or animatronic 197 may include the whole character.

Figure 2:
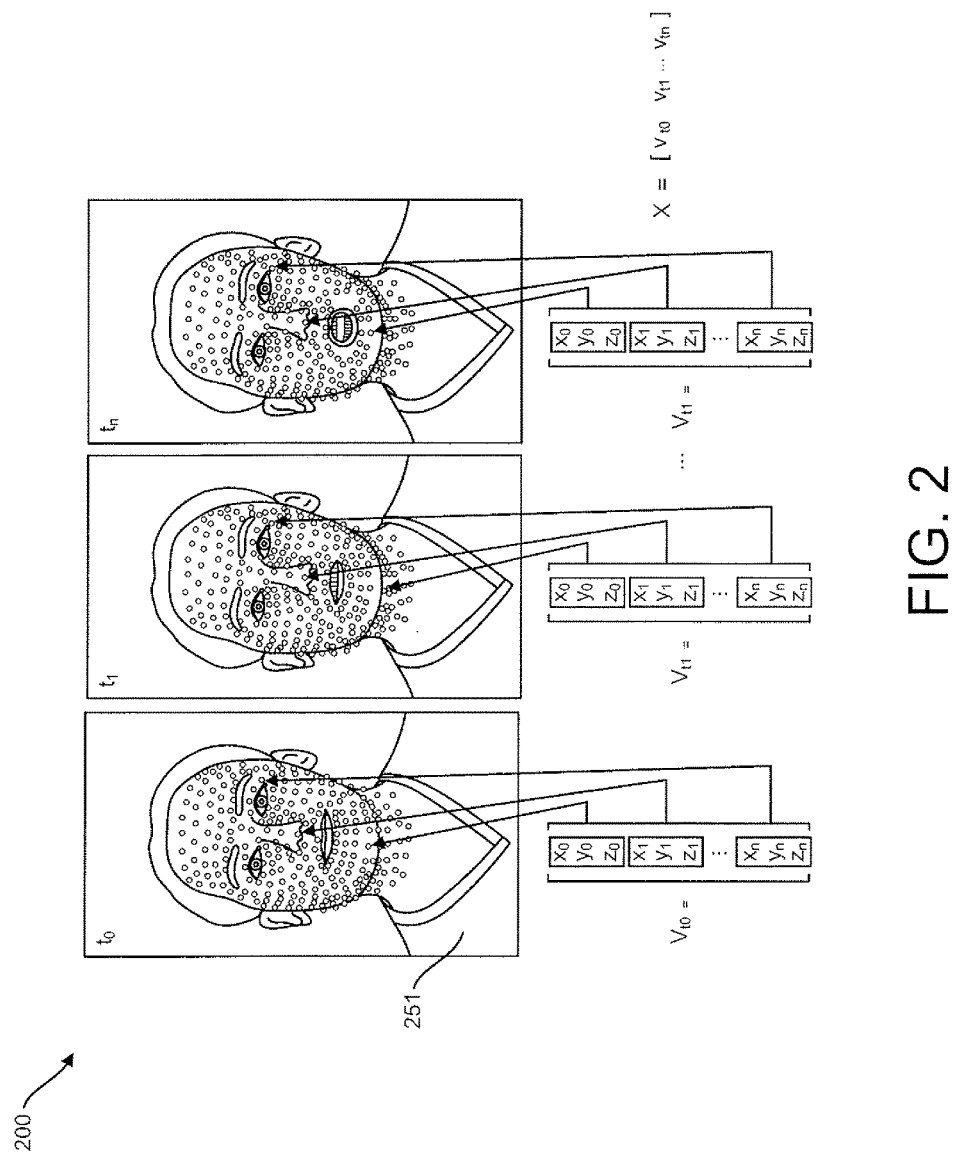
FIG. 2 shows a diagram of an exemplary data collection for use with the system of FIG. 1, according to one implementation of the present disclosure.

FIG. 2 shows a diagram of an exemplary data collection for use with the system of FIG. 1, according to one implementation of the present disclosure. 3D character data 135 may acquire dynamic 3D data of a character from input device 107. Diagram 200 shows 3D character data of human character 251 at times $t_0$, $t_1$, and $t_n$, where human character 251 is making a different facial expression at each time. The position of each point of the face of character 251 may be captured as it moves in time and space, where in one implementation, the points may correspond to the intersections of lines in the constant topology mesh of human character 251. The face of character 251 may be described at $t_0$ by $v_{t0}$, at $t_1$ by $v_{t1}$, and at $t_n$ by $v_{tn}$, where $v_{t0}$ includes a 3D coordinate for each point on the face of human character 251 with point 0 represented by the coordinates $x_0$, $y_0$, $z_0$, point 1 represented by the coordinates $x_1$, $y_1$, $z_1$, up to point n which may be represented by the coordinates $x_n$, $y_n$, $z_n$. In some implementations, character data may be expressed as a matrix, were each column represents a single pose of the character, as shown in FIG. 2. Each element of the matrix X may include the 3D representation of each point of the character information. Where matrix X is represented by:

$$X=[v_{t0} v_{t1} \ldots v_n]$$

3D character data may be acquired using several techniques including, for example, marker-based motion capture, markerless motion capture, performance capture, monocular-video-based performance capture, or any other 3D data capturing techniques.

Figure 3:
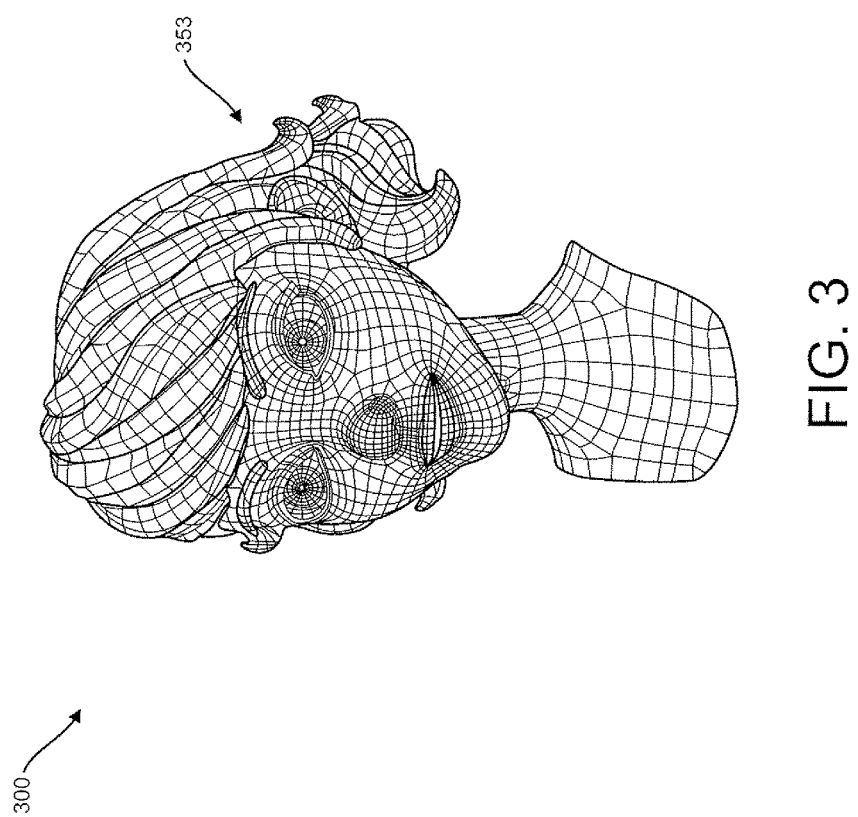
FIG. 3 shows a diagram of an exemplary animated character for use with the system of FIG. 1, according to one implementation of the present disclosure.

FIG. 3 shows a diagram of an exemplary animated character for use with the system of FIG. 1, according to one implementation of the present disclosure. Diagram 300 shows animated character 353, including a constant-topology 3D mesh defining the face of animated character 353. 3D character data 135 corresponding to animated character 353 may be acquired directly from the software used to create animated character 353. In some implementations, animation programs use 3D geometry to animate each character, where the character may be described by a collection of connected 3D vertices that move in time and space. Accordingly, the animation data used to create animated character 353 may be exported to computing device 110 and stored as 3D character data 135.

Figure 4:
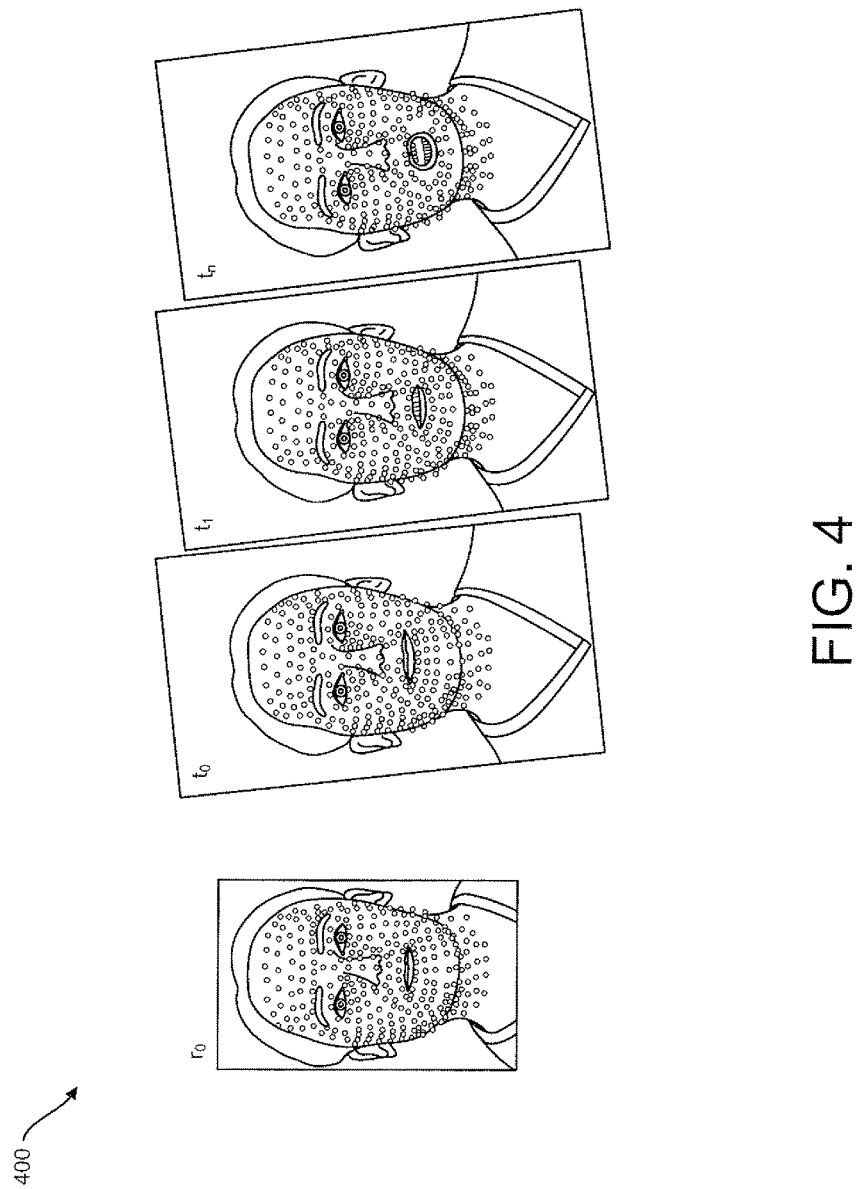
FIG. 4 shows a diagram of exemplary stabilized three-dimensional (3D) character data, according to one implementation of the present disclosure.

FIG. 4 shows a diagram of stabilized 3D character data, according to one implementation of the present disclosure. Diagram 400 shows image $r_0$ which depicts the stabilized image of human character 451 shown in images $t_0$, $t_1$, and $t_n$. In some implementations, animatronics software application 140 may determine the range of motion for different regions of the face of human character 451. To determine the range of motion of the different areas of the face, it is necessary to remove all rigid-body motion (translations and rotations of the head) from the dynamic 3D data. Different techniques may be used to stabilize the data. From a mathematical standpoint, stabilization entails finding a transformation matrix that aligns each column of X to a desired reference.

$$x_{r0} = \begin{bmatrix} x_0 & x_1 & \ldots & x_n \\ y_0 & y_1 & \ldots & y_n \\ z_0 & z_1 & \ldots & z_n \\ 1 & 1 & \ldots & 1 \end{bmatrix}$$

$$x_{t0} = \begin{bmatrix} x_0 & x_1 & \ldots & x_n \\ y_0 & y_1 & \ldots & y_n \\ z_0 & z_1 & \ldots & z_n \\ 1 & 1 & \ldots & 1 \end{bmatrix}$$

$$x_{t1} = \begin{bmatrix} x_0 & x_1 & \ldots & x_n \\ y_0 & y_1 & \ldots & y_n \\ z_0 & z_1 & \ldots & z_n \\ 1 & 1 & \ldots & 1 \end{bmatrix}$$

$$x_{tm} = \begin{bmatrix} x_0 & x_1 & \ldots & x_n \\ y_0 & y_1 & \ldots & y_n \\ z_0 & z_1 & \ldots & z_n \\ 1 & 1 & \ldots & 1 \end{bmatrix}$$

$$\min_{M_{t0}} |x_{r0} - M_{t0}(x_{t0})|^2$$

$$\min_{M_{t1}} |x_{r0} - M_{t1}(x_{t1})|^2$$

$$\min_{M_{tn}} |x_{r0} - M_{tn}(x_{tn})|^2$$

Each column of X can be re-arranged into a matrix of homogenous coordinates, in order to find the transformation M that aligns the column to the reference $x_{r0}$. M is constrained so that it effects rotation and translation but no scaling or shearing. There are many conventional methods to find M.

$$X_s = [\text{vec}(M_{t0}x_{t0})\text{vec}(M_{t1}x_{t1}) \ldots \text{vec}(M_{tn}x_{tn})]$$

After finding M, a new stabilized X can be defined as $X_s$, where the operator vec removes the row of 1's added to make homogenous coordinates and stacks the columns of its argument. The matrix $X_s$, can be used to create a data-driven animation rig of the dynamic 3D data. The rig may be fully data driven or may leverage a generic already available animation rig, allowing pre-visualization and initial show development. In some implementations, the data-driven animation rig may allow an animator to create additional animation data that can be incorporated into $X_s$, either as additional columns or by replacing some of the existing columns. In this way, an artist can add desired range of motion to animatronic 197.

Figure 5:
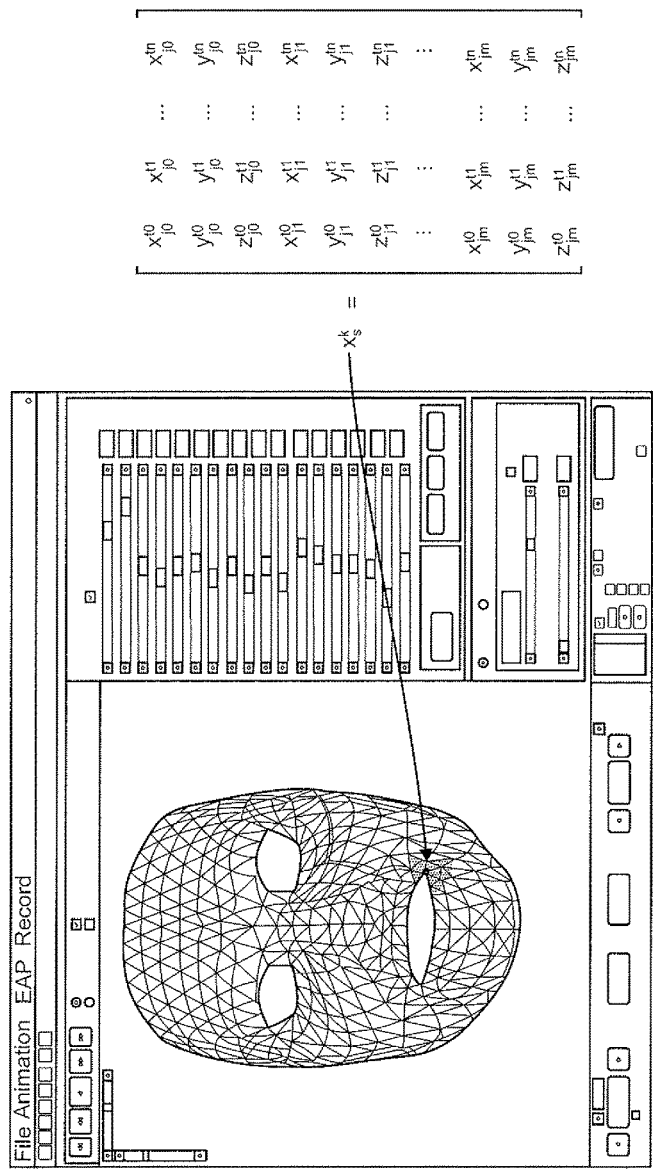
FIG. 5 shows a diagram of an exemplary topology mesh for use with the system of FIG. 1, according to one implementation of the present disclosure.

FIG. 5 shows a diagram of an exemplary topology mesh for use with the system of FIG. 1, according to one implementation of the present disclosure. For any given $k^{th}$ point/region of the face (mouth corner and its 6 adjacent vertices in this example), it is possible to extract the corresponding data from stabilized 3D character data $X_s$ into matrix $X_s^k$.

$$X_s^k = \begin{bmatrix} x_{j0}^{t0} & x_{j0}^{t1} & \ldots & x_{j0}^{tn} \\ y_{j0}^{t0} & y_{j0}^{t1} & \ldots & y_{j0}^{tn} \\ z_{j0}^{t0} & z_{j0}^{t1} & \ldots & z_{j0}^{tn} \\ x_{j1}^{t0} & x_{j1}^{t1} & \ldots & x_{j1}^{tn} \\ y_{j1}^{t0} & y_{j1}^{t1} & \ldots & y_{j1}^{tn} \\ z_{j1}^{t0} & z_{j1}^{t1} & \ldots & z_{j1}^{tn} \\ \vdots & \vdots & & \vdots \\ x_{jm}^{t0} & x_{jm}^{t1} & \ldots & x_{jm}^{tn} \\ y_{jm}^{t0} & y_{jm}^{t1} & \ldots & y_{jm}^{tn} \\ z_{jm}^{t0} & z_{jm}^{t1} & \ldots & z_{jm}^{tn} \end{bmatrix}$$

In some implementations, 3D character data 135 may include a mesh describing a face of the character, a head of the character, the whole character, or any other part of the character. $X_s^k$ can then be reconfigured into a (mn)×3 matrix Pk by concatenating every three (3) rows of $X_s^k$.

$$X_s^k = \begin{bmatrix} x_{j0}^{t0} & x_{j0}^{t1} & \ldots & x_{j0}^{tn} \\ y_{j0}^{t0} & y_{j0}^{t1} & \ldots & y_{j0}^{tn} \\ z_{j0}^{t0} & z_{j0}^{t1} & \ldots & z_{j0}^{tn} \\ x_{j1}^{t0} & x_{j1}^{t1} & \ldots & x_{j1}^{tn} \\ y_{j1}^{t0} & y_{j1}^{t1} & \ldots & y_{j1}^{tn} \\ z_{j1}^{t0} & z_{j1}^{t1} & \ldots & z_{j1}^{tn} \\ \vdots & \vdots & & \vdots \\ x_{jm}^{t0} & x_{jm}^{t1} & \ldots & x_{jm}^{tn} \\ y_{jm}^{t0} & y_{jm}^{t1} & \ldots & y_{jm}^{tn} \\ z_{jm}^{t0} & z_{jm}^{t1} & \ldots & z_{jm}^{tn} \end{bmatrix} \Rightarrow P_k = \begin{bmatrix} x_{j0}^{t0} & \ldots & x_{jm}^{t0} & \ldots & x_{j0}^{tn} & \ldots & x_{jm}^{tn} \\ y_{j0}^{t0} & \ldots & y_{jm}^{t0} & \ldots & y_{j0}^{tn} & \ldots & y_{jm}^{tn} \\ z_{j0}^{t0} & \ldots & z_{jm}^{t0} & \ldots & z_{j0}^{tn} & \ldots & z_{jm}^{tn} \end{bmatrix}$$

$P^k$ then contains the coordinate positions of all the points in the region of interest for all animation frames. Applying principal component analysis to $P^k$ yields the principal components $B^k$. We can the truncate $B^k$ to create $B^k_2$ which contains the two axes that specify the best projection plane for the region's motion.

Figure 6:
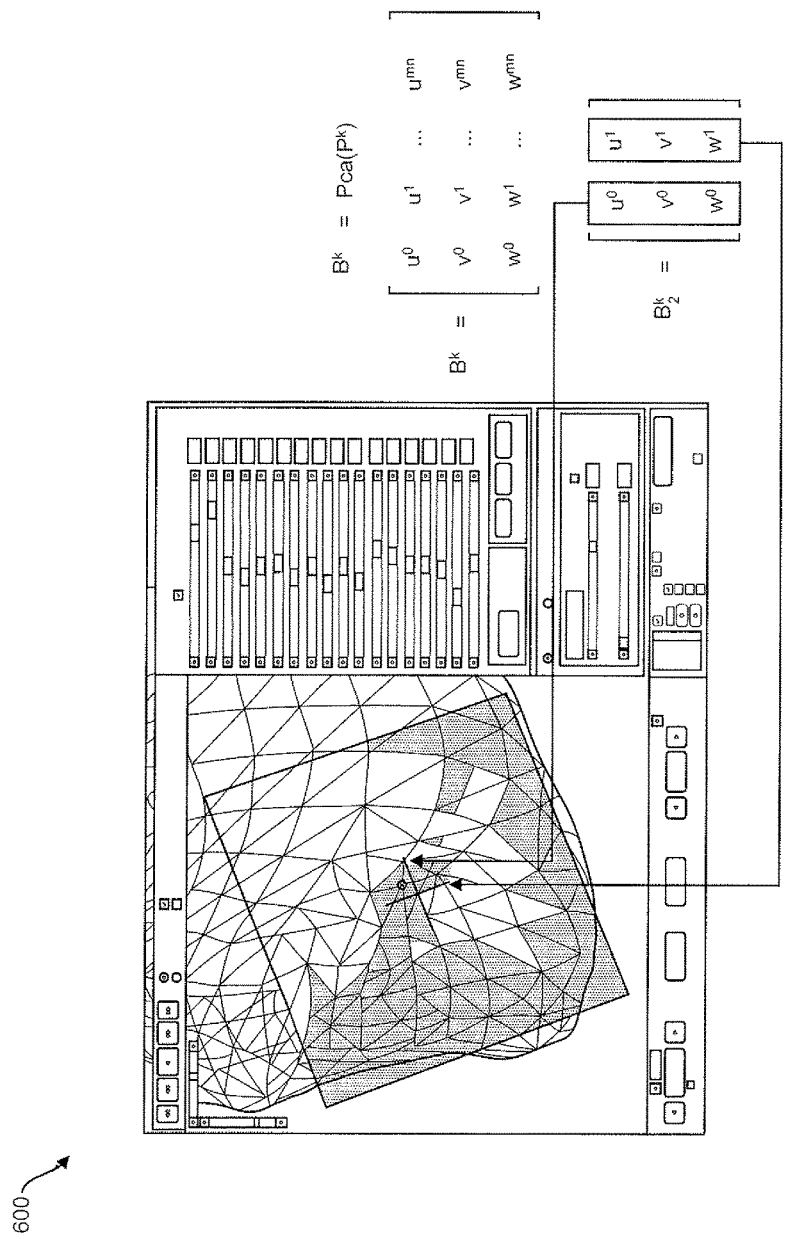
FIG. 6 shows a diagram of an exemplary processing of the topology mesh of FIG. 5 for use with the system of FIG. 1, according to one implementation of the present disclosure.

FIG. 6 shows a diagram of an exemplary processing of the topology mesh of FIG. 4, for use with the system of FIG. 1, according to one implementation of the present disclosure. Diagram 600 shows a 2D plane corresponding to the plane of motion of the kth point in the mesh. Applying principal component analysis to $P^k$ yields the principal components $B^k$. $B^k$ may be truncated to create $B^k_2$ which contains the two axes that specify the best projection plane for the region's motion. $B^k_2$ may be used to project $P^k$ to the principal plane, to obtain the 2D motion on the plane that corresponds to the 3D motion of the point/region of interest, where $Q^k=(B^k_2{}^T)P^k$. Although FIG. 6 shows a 2D plane corresponding to the plane of motion of the kth point in the mesh, in some implementations, a point/region of interest may move in three dimensions or even in one dimension, and the motions of each point/region of interest may be obtained by performing a principal component analysis to determine the 3D motion or the 1D motion of the point/region of interest, respectively.

Turning back to FIG. 6, the 2D data in $Q^k$ can be rearranged to the original format of $X^k_3$, to create $U^k$, which allows animatronics application 110 to determine the motion of a region of interest by averaging all of the odd and even rows independently, describing the trajectory of a single point in two dimensions.

$$Q^k = \begin{bmatrix} u_{j_0}^{t_0} & \cdots & u_{j_m}^{t_0} & \cdots & u_{j_0}^{t_n} & \cdots & u_{j_m}^{t_n} \\ v_{j_0}^{t_0} & \cdots & v_{j_m}^{t_0} & \cdots & v_{j_0}^{t_n} & \cdots & v_{j_m}^{t_n} \end{bmatrix} \Rightarrow U^k = \begin{bmatrix} u_{j_0}^{t_0} & u_{j_0}^{t_1} & \cdots & u_{j_0}^{t_n} \\ v_{j_0}^{t_0} & v_{j_0}^{t_1} & \cdots & v_{j_0}^{t_n} \\ u_{j_1}^{t_0} & u_{j_1}^{t_1} & \cdots & u_{j_1}^{t_n} \\ v_{j_1}^{t_0} & v_{j_1}^{t_1} & \cdots & v_{j_1}^{t_n} \\ \vdots & \vdots & & \vdots \\ u_{j_m}^{t_0} & u_{j_m}^{t_1} & \cdots & u_{j_m}^{t_n} \\ v_{j_m}^{t_0} & v_{j_m}^{t_1} & \cdots & v_{j_m}^{t_n} \end{bmatrix}$$

Each column in $U^k$ may correspond to data/animation frames that are consecutive in time, making it possible to compute the planar velocity and acceleration of a point or region of interest by taking the difference between columns and dividing by the interval of time elapsed between data/animation frames. The velocity of the point or region of interest may help define the specifications for the actuators used in designing and building animatronic 197 in order to meet the velocity and acceleration demands of the character.

Figure 7:
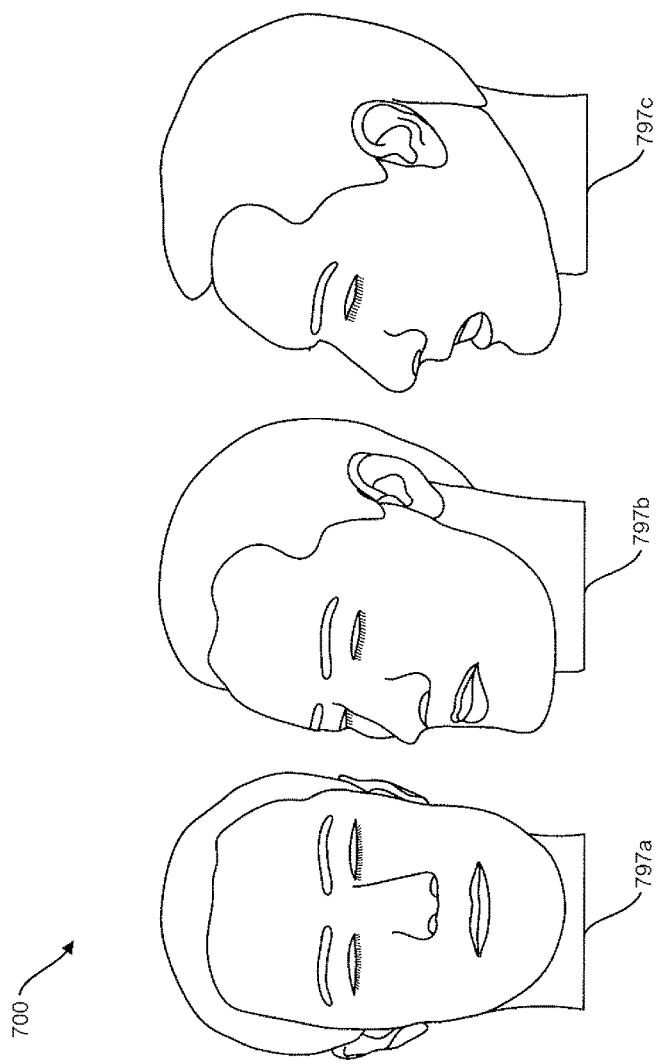
FIG. 7 shows a diagram of an exemplary animatronic, according to one implementation of the present disclosure.

FIG. 7 shows a diagram of an exemplary animatronic, according to one implementation of the present disclosure. FIG. 7 shows animatronic 700, which may include a plurality of actuators capable of creating a plurality of poses 797a, 797b and 797c shown in FIG. 7. In some implementations, each point of a plurality of points on the face of animatronic 700 may have a corresponding actuator within animatronic 700. In other implementations, animatronic 700 may have a plurality of actuators, but fewer than the number of points of the constant-topology mesh. Animatronic 700 may additionally include actuators to move other parts of animatronic 700, such as actuators to move the eyes, the ears, the scalp, etc. Animatronic 700 may be used to capture the pose space of animatronic 700. In some implementations, animatronic 700 may include a face and a head of the character to be animated. Animatronic 700 may include a body of the character to be animated, and may include clothing and other props and accessories associated with the character to be animated.

Figure 8:
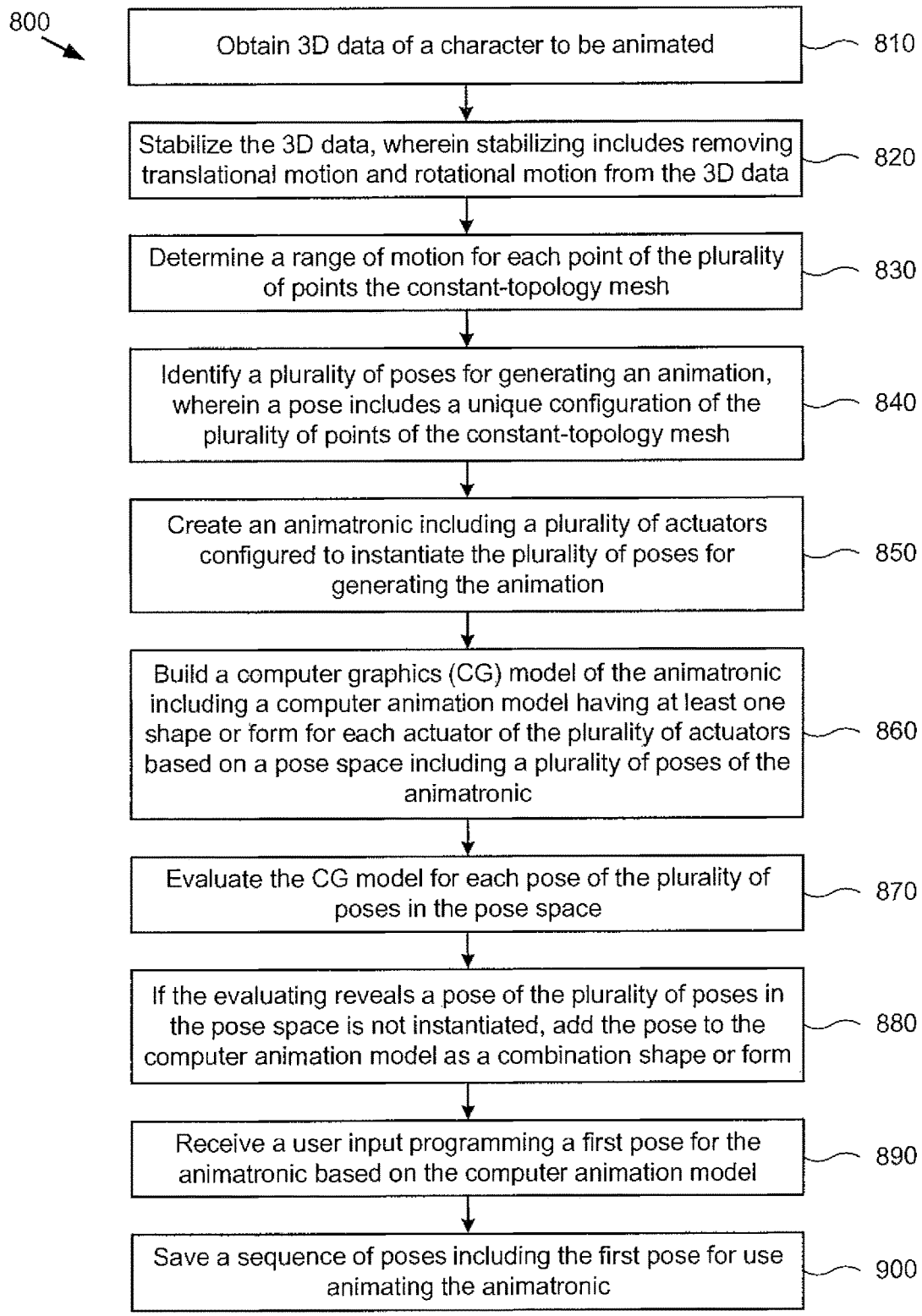
FIG. 8 shows a flowchart illustrating an exemplary method of designing and animating animatronics, according to one implementation of the present disclosure.

FIG. 8 shows an exemplary flowchart illustrating a method of designing and animating animatronics, according to one implementation of the present disclosure. Flowchart 800 begins at 810, where animatronics software application 140 obtains 3D data of a character to be animated. The 3D data may be obtained by capturing 3D data of a human character using 3D scanning techniques, photo processing techniques, video processing techniques, or any combination of 3D scanning, photo processing, and video processing techniques. Animatronics software application 140 may obtain 3D data of a CG character from the animation data.

At 820, animatronics software application 140 stabilizes the 3D data, where stabilizing includes removing translational motion and rotational motion from the 3D data. 3D data obtained from CG characters can be stabilized by estimating the rigid motion directly from a small subset of rigid points on the back and top of the head of the CG character. In contrast, 3D data obtained from human faces may lack rigid points and may require a more comprehensive approach to stabilization. Once stabilized, the 3D data may be processed to precisely determine the range and principal plane of motion of any point on the face and to identify facial poses that are critical for generating expressive animations, allowing animatronics software application 140 to design animatronic 197 to closely match the motion patterns of the intended character within the constraints of mechanical limits. In some implementations, stabilizing the 3D data may preserve local motion but remove bulk motion.

At 830, animatronics software application 140 determines a range of motion for each point of the plurality of points the constant-topology mesh. The range of motion may include a line of motion, an arc of motion, a plane of motion, a volume of motion, etc. In some implementations, the principal plane of motion may be determined by performing a principal component analysis on a matrix including the coordinate positions of all the points of the constant-topology mesh. By identifying the principal plane of motion for each point in the constant-topology mesh, animatronics software application 140 may identify a placement and orientation of a plurality of actuators within animatronic 197.

At 840, animatronics software application 140 identifies a plurality of poses for generating an animation, wherein a pose includes a unique configuration of the plurality of points of the constant-topology mesh. The identified plurality of poses may include poses to be instantiated on animatronic 197. In some implementations, animatronics software application 140 may use 3D character data 135 to identify a plurality of poses expressed by the character to be animated. For example, when the character is an animated character, 3D character data 135 may include data from a plurality of scenes in a movie describing the movements of the character that can be used to identify the plurality of poses the animated character may make. In other implementations, a plurality of poses may be based on a video of a human character, a photograph of a human character, or a plurality of photographs of a human character. It should be noted that, animatronics software application 140 may perform the task 840 prior to the task 830 when poses are from the stabilized input data.

At 850, animatronics software application 140 helps guide the design of an animatronic, including a plurality of actuators configured to instantiate the plurality of poses for generating the animation. In some implementations, animatronic software application 140 may create a plan for an animatronic, such as animatronic 197, that includes a plurality of actuators. The plurality of actuators may be configured to enable animatronic 197 to emulate the movements of the character such that animatronic 197 can reproduce each pose of the plurality of poses identified for the character.

At 860, animatronics software application 140 builds a CG model of the animatronic including a computer animation model, such as a blendshape model having at least one blendshape or form for each actuator of the plurality of actuators based on a pose space including a plurality of poses of the animatronic. In some implementations, a pose space of animatronic 197 may describe each possible configuration of the plurality of actuators in animatronic 197. In some implementations, each actuator may move multiple directions. To sample the pose space, animatronics software application 140 may sample each actuator moving in each of its directions, and the interactions of multiple actuators.

To create the CG model of the animatronic, animatronics software application 140 may extensively sample the pose space of animatronic 197 by 3D scanning the animatronic in a large number of poses. The number of scanned poses depends on the number of actuators in animatronic 197 and their interdependencies. Attaining the pose space may begin with a 3D scan of animatronic 197 with only one actuator activated at different levels of its range of motion, for example at 25%, 50%, 75%, and 100%, in each of the possible motion directions. Animatronics software application 140 may then identify groups of actuators that have their motions coupled because of the proximity of the actuators. For instance, two actuators that affect the right eyebrow may be coupled with each other, but may not be coupled with actuators that affect the left eyebrow. Each group of actuators may have at least two members, but may contain more, and any given actuator may belong to more than one group. For each group, animatronics software application 140 may 3D capture all possible activation combinations of the actuators in the group, providing a data set that samples the pose space of animatronic 197 and its linearity/non-linearity. The pose data may be used to build a computer animation model, such as a blendshape model with intermediate and combination shapes. In other implementations, the pose space may be obtained by simulating each possible pose of animatronic 197 using a digital model.

Based on 3D character data 135 and the pose space of animatronic 197, animatronic software application 140 may build a CG model of animatronic 197. The CG model of animatronic 197 may be a blend shape model, where a blend shape may be a deformer that can be used as a modeling tool, an animation tool, or both a modeling and an animation tool. The 3D data that samples the pose space, whether obtained by capture or simulation, can be expressed in matrix form as:

$$X = \begin{bmatrix} x_0^{p0} & x_0^{p1} & \ldots & x_0^{pn} \\ y_0^{p0} & y_0^{p1} & \ldots & y_0^{pn} \\ z_0^{p0} & z_0^{p1} & \ldots & z_0^{pn} \\ x_1^{p0} & x_1^{p1} & \ldots & x_1^{pn} \\ y_1^{p0} & y_1^{p1} & \ldots & y_1^{pn} \\ z_1^{p0} & z_1^{p1} & \ldots & z_1^{pn} \\ \vdots & \vdots & & \vdots \\ x_m^{p0} & x_m^{p1} & \ldots & x_m^{pn} \\ y_m^{p0} & y_m^{p1} & \ldots & y_m^{pn} \\ z_m^{p0} & z_m^{p1} & \ldots & z_m^{pn} \end{bmatrix}$$

where each column is one of the captured poses. The columns may be sorted so that the first column is the neutral pose, where all actuators are set to 0, the following block has poses with only one actuator active, followed by the block with two actuators active, and so on. In some implementations, animatronics software application 140 may express X as a difference from the neutral pose by subtracting the first column of X from the rest of the columns. Moreover, animatronics software application 140 may build a redundant blend shape model with all of the pose space data, so that new poses can be created by linearly combining the captured and simulated poses $$\hat{x} = \bar{x} + X_D w$$

where $\hat{x}$ is a new pose, $\bar{x}$ is the first column of X, $X_D$ is the rest of the columns of X after subtracting $\bar{x}$, and w is a column vector of weights that specifies the contribution of each pose in $X_D$ to the resulting pose. To reduce the redundancy in the CG model, animatronics software application 140 may create an initial blend shape rig that contains only the columns from $X_D$ that correspond to one actuator active, $$\hat{x} = \bar{x} + B_0 w_0$$

where $B_0$ is the subset of $X_D$ that corresponds to only one actuator active and $w_0$ is the corresponding set of weights from w pose.

At 870, animatronics software application 140 evaluates the CG model for each pose of the plurality of poses in the pose space. In some implementations, animatronics software application 140 may know which actuators were activated to create each captured/simulated pose, Accordingly, animatronics software application 140 may use the reduced redundancy model to reconstruct the captured/simulated data:

$$\hat{X}_D = B_0 w_0^x$$

where $w_0^x$ are the weights that correspond to the actuator values used during the capture. However, instead of reconstructing all the captured/simulated data, animatronics software application 140 may begin by only reconstructing the portion of the data for which two actuators were activated:

$$\hat{X}_D^2 = B_0 w_0^{x^2}$$

Animatronics software application 140 may then compare the reconstructed $\hat{X}_D^2$ with the corresponding captured/simulated data $X_D^2$ by computing the Euclidean distance between each of their columns. If the Euclidean distance between a given pair is greater that a user defined tolerance threshold, then the model failed to reconstruct that pose and it needs to be added to the model as a combination shape.

At 880, if the evaluation reveals that a pose of the plurality of poses in the pose space is not instantiated, animatronics software application 140 adds the pose to the computer animation model as a combination shape. In some implementations, all the shapes of the block $X_D^2$ that the model failed to reconstruct are added as combination shapes $B_2$ as follows:

$$B_2 = \tilde{X}_D^2 - B_0 w_0^{x^2}$$

where $\tilde{X}_D^2$ are the shapes from D that the model failed to reconstruct. Accordingly, the new blend shape model becomes $$\hat{x} = \bar{x} + B_0 w_0 + B_2 w_2(w_0)$$

Each element in $w_2$ may be the product of the two elements in $w_0$ that correspond to the two actuators that were active to create the corresponding shape. The rig building process continues by using the new blend shape rig model to reconstruct the block of captured/simulated data that corresponds to three active actuators. The shapes that the rig fails to reconstruct are added as combination shape to make a new model. The process keeps going until all captured/simulated data has been evaluated and all necessary combination shapes have been added.

$$\hat{x} = \bar{x} + B_0 w_0 + B_2 w_2(w_0) = B_3 w_3(w_0) + \ldots + B_k w_k(w_0)$$

At 890, animatronics software application 140 receives a user input programming a first pose for the animatronic based on the computer animation model. In some implementations, an animator may create a pose for animatronic 197 including a configuration of actuators. The animator may enter the pose using a user interface such as input device 107. Flowchart 800 continues at 900, where animatronics software application 140 saves a sequence of poses including the first pose for use animating the animatronic. In some implementations, the saved sequence may be used to animate animatronic 197, and the sequence may additionally be used to animate a second animatronic that is a duplicate of animatronic 197. For example, animatronic 197 may be used to animate a character at one theme park, and another animatronic that is a duplicate of animatronic 197 may be used to animate the same character at another theme park.

Using system 100, an animator may create a sequence of poses, such as a sequence in sequences 139, and the sequence may be used to animate animatronic 197 in California and the duplicate animatronic in Florida.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a hardware processor and a memory storing a three-dimensional (3D) character data having a topology mesh describing a character, the method comprising:
    stabilizing, using the hardware processor, the 3D character data, wherein the stabilizing includes removing a translational motion and a rotational motion from the 3D character data;
    determining, using the hardware processor, a range of motion of a plurality of points of the topology mesh describing the character;
    identifying, using the hardware processor, a plurality of poses for generating an animation, wherein each pose of the plurality of poses includes a unique configuration of the plurality of points of the topology mesh;
    creating an animatronic including a plurality of actuators configured to instantiate the plurality of poses for generating the animation;
    building a computer graphics (CG) model of the animatronic including a computer animation model having at least one blendshape for each actuator of the plurality of actuators based on a pose space including a plurality of captured or simulated poses of the animatronic;
    evaluating the CG model for each pose of the plurality of poses in the pose space to determine whether a pose of the plurality of poses can be reconstructed by the blendshapes for one or more of the plurality of actuators; and
    in response to determining that the pose cannot be reconstructed by the blendshapes for the plurality of actuators, adding the pose to the computer animation model as a combination shape for reconstructing by the blendshapes for two or more of the plurality of actuators.

2. The method of claim 1, wherein the character is an animated character.

3. The method of claim 2, wherein the 3D character data includes an animation data corresponding to the animated character.

4. The method of claim 1, wherein the character is a human character.

5. The method of claim 4, wherein the 3D character data includes at least one of a 3D scanning data of the human character and a video processing data of the human character.

6. The method of claim 1, wherein the topology mesh includes a face of the character.

7. The method of claim 6, wherein the plurality of poses for generating the animation includes a plurality of facial expressions of the face of the character.

8. A system for animating an animatronic, the system comprising:
    a memory storing an animatronics application and a three-dimensional (3D) character data including a topology mesh having a plurality of points describing a character;
    a hardware processor executing the animatronics application to:
        stabilize the 3D character data, wherein stabilizing includes removing a translational motion and a rotational motion from the 3D character data;
        determine a range of motion for each point of the plurality of points the topology mesh;
        identify a plurality of poses for generating an animation, wherein each pose of the plurality of poses includes a unique configuration of the plurality of points of the constant-topology mesh;
        create an animatronic including a plurality of actuators configured to instantiate the plurality of poses for generating the animation;
        build a computer graphics (CG) model of the animatronic including a computer animation model having at least one blendshape for each actuator of the plurality of actuators based on a pose space including a plurality of captured or simulated poses of the animatronic;
        evaluate the CG model for each pose of the plurality of poses in the pose space to determine whether a pose of the plurality of poses can be reconstructed by the blendshapes for one or more of the plurality of actuators; and
        in response to determining that the pose cannot be reconstructed by the blendshapes for the plurality of actuators, adding the pose to the computer animation model as a combination shape for reconstructing by the blendshapes for two or more of the plurality of actuators.

9. The system of claim 8, wherein the hardware processor further configured to:
    receive a user input for programming a first pose for the animatronic, the first pose including a position of at least an actuator of the plurality of actuators.

10. The system of claim 8, wherein the hardware processor is further configured to:
    save a sequence of poses including the first pose for animating an animatronic.

11. The system of claim 8, wherein the hardware processor is further configured to:
    receive an additional 3D information corresponding to a new pose; and
    automatically retarget the CG model to instantiate the new pose.

12. The system of claim 8, wherein the character is an animated character and the 3D data includes an animation data corresponding to the animated character.

13. The system of claim 8, wherein the character is a human character and the 3D data includes at least one of a 3D scanning data of the human character and video processing data of the human character.

14. The system of claim 8, wherein the hardware processor is further configured to:
    receive a user input for programming a first pose for the animatronic based on the computer animation model.

15. The system of claim 8, wherein the hardware processor is further configured to:
 save a sequence of poses including the first pose for animating the animatronic.

\* \* \* \* \*